United States Patent
Huang et al.

(10) Patent No.: US 10,956,523 B2
(45) Date of Patent: Mar. 23, 2021

(54) METHOD AND SYSTEM FOR PROVIDING A HIGHLY-PERSONALIZED RECOMMENDATION ENGINE

(71) Applicants: Yu Huang, Beijing (CN); Fang Chen, San Diego, CA (US)

(72) Inventors: Yu Huang, Beijing (CN); Fang Chen, San Diego, CA (US)

(73) Assignees: Yu Huang, Beijing (CN); Fang Chen, San Diego, CA (US)

(*) Notice: Subject to any disclaimer, the term of this patent is extended or adjusted under 35 U.S.C. 154(b) by 116 days.

(21) Appl. No.: 16/129,453

(22) Filed: Sep. 12, 2018

(65) Prior Publication Data

US 2019/0080012 A1 Mar. 14, 2019

Related U.S. Application Data

(60) Provisional application No. 62/557,747, filed on Sep. 12, 2017, provisional application No. 62/558,340, filed on Sep. 13, 2017.

(51) Int. Cl.
*G06F 16/9535* (2019.01)
*G06K 9/00* (2006.01)
(Continued)

(52) U.S. Cl.
CPC .......... *G06F 16/9535* (2019.01); *G06F 16/51* (2019.01); *G06F 16/5838* (2019.01);
(Continued)

(58) Field of Classification Search
CPC .......... G06K 9/00268; G06K 9/00288; G06K 9/00295; G06K 9/66; G06K 9/6256;
(Continued)

(56) References Cited

U.S. PATENT DOCUMENTS 10,489,688 B2 * 11/2019 Shen .................... G06K 9/6269
2012/0059850 A1 * 3/2012 Bent .................... G06F 16/532
707/776

OTHER PUBLICATIONS

Rothe, et al. (Some like it hot—visual guidance for preference prediction), pp. 1-9. (Year: 2016).*

* cited by examiner

*Primary Examiner* — Daniel G Mariam
(74) *Attorney, Agent, or Firm* — Frank Chen Patent & IP Services (57) ABSTRACT

Various embodiments of a deep learning (DL)-based face perception engine for constructing, providing, and applying a highly-personalized face perception model for an individual through a deep learning process are disclosed. In some embodiments, a disclosed face perception engine includes a deep neural network configured for training a personalized face perception model for a unique individual based on a standard set of training images and a corresponding set of decisions on the set of training images provided by the unique individual. When sufficiently trained using the standard set of training images and the corresponding set of decisions, the personalized face perception model for the unique individual perceives a new face photo/image as if through the eyes of that unique individual. Hence, the trained face perception model can be used an "agent" or "representative" of the associated person in making very personal decisions, such as to decide if a given face photo/image includes a desirable face in the eyes of that person.

19 Claims, 4 Drawing Sheets

(51) Int. Cl.
*G06N 3/08* (2006.01)
*G06F 16/51* (2019.01)
*G06F 16/583* (2019.01)
*G06K 9/62* (2006.01)

(52) U.S. Cl.
CPC ..... *G06K 9/00268* (2013.01); *G06K 9/00288* (2013.01); *G06K 9/6256* (2013.01); *G06K 9/6271* (2013.01); *G06N 3/08* (2013.01)

(58) Field of Classification Search
CPC ........ G06K 9/6271; G06N 20/00; G06N 3/08; G06F 16/51; G06F 16/9535; G06F 16/24573
USPC .................................. 382/118, 156, 159, 209
See application file for complete search history.

METHOD AND SYSTEM FOR PROVIDING A HIGHLY-PERSONALIZED RECOMMENDATION ENGINE

PRIORITY CLAIM AND RELATED PATENT APPLICATIONS

This patent application claims benefit of priority under 35 U.S.C. 119(e) to U.S. Provisional Patent Application No. 62/557,747 entitled "METHOD AND SYSTEM FOR PROVIDING A HIGHLY-PERSONALIZED RECOMMENDATION ENGINE," by inventors Yu Huang and Fang Chen, and filed on Sep. 12, 2017, the content of which is incorporated herein by reference as a part of this patent document.

This patent application also claims benefit of priority under 35 U.S.C. 119(e) to U.S. Provisional Patent Application No. 62/558,340 entitled "METHOD AND SYSTEM FOR PROVIDING A HIGHLY-PERSONALIZED RECOMMENDATION ENGINE," by inventors Yu Huang and Fang Chen, and filed on Sep. 13, 2017, the content of which is incorporated herein by reference as a part of this patent document.

TECHNICAL FIELD

This patent document generally relates to deep learning and deep learning-based recommendation systems, and more specifically to systems, devices, and processes for providing a highly-personalized recommendation engine for online dating services and mobile dating applications based on facial recognition and deep learning technology.

BACKGROUND

Driven by the explosive growth in social networking applications and computing technology, online dating services and mobile dating applications have become increasingly prevalent and have reshaped the way people look for potential dates. To use a popular online dating service or mobile dating App, a person simply pays a fee and creates a profile with at least one photo of him or herself to join, and then instantly gain access to virtually an unlimited number of potential dates. Online dating services and mobile dating applications (or "Apps") represent a multi-billion dollar industry which is expected to continue its rapid growth.

For any given popular online dating service or mobile dating App, a user routinely faces the task of judging through a large number of profiles that meet the user's general descriptions for potential dates. To speed up this process for a user, some of these services and Apps allow the user to make quick "like" or "dislike" decisions of recommended users based on a single profile photo of another user. For example, Tinder™ smartphone App allows a user to accept or reject another user with a single left or right swipe on the other user's profile photo. However, using a single action/gesture selection to accept or reject profile photos can lead to a time-consuming and frustrating experience because the users still have to go through a large number of profile photos, but often end up rejecting most or all of the recommended profiles.

SUMMARY

Disclosed are various embodiments of an artificial intelligence (AI)/Deep learning (DL)-based face perception engine for constructing and providing a highly-personalized face perception model for a unique individual through a deep learning process. In some embodiments, a disclosed face perception engine includes a DL neural network (also referred to as "deep neural network"), such as a convolution neural network (CNN) configured for training a personalized face perception model for the unique individual based on a standard set of training images and a corresponding set of decisions on the set of training images provided by the unique individual. When sufficiently trained using the standard set of training images and the corresponding set of decisions, the personalized face perception model for the unique individual perceives a new face photo/image as if through the eyes of that unique individual. Hence, the trained face perception model can be used an "agent" or "representative" of the associated person in making very personal decisions, such as to decide if a given face photo/image includes a desirable face in the eyes of that person. Moreover, the trained face perception model can be built into various applications and used across various platforms, including online dating services and mobile dating Apps, as well as content delivery services, advertisement services, entertainment Apps, and other types of recommendation engines.

In one aspect, a process for constructing a personalized face perception model for a unique individual is disclosed. This process includes the steps of: receiving a set of face images and a corresponding set of desirability scores, wherein each of the desirability scores represents a degree of desirability toward an associated face image provided by the individual based on the individual's perception of a desirable face; providing the set of face images and the corresponding set of desirability scores to a deep learning (DL) neural network, wherein the DL neural network includes a set of features and a set of parameters associated with the set of features; and training the DL neural network using the set of face images as inputs and the corresponding set of desirability scores as outputs to generate a personalized face perception model for the unique individual, wherein the personalized face perception model includes a trained set of parameters which is unique to the unique individual. Subsequently, the personalized face perception model can be used to automatically infer a desirability score from a new face image on behalf of the unique individual according to the learned perception of the unique individual.

In some embodiments, prior to receiving the set of face images and the corresponding set of desirability scores, the process generates the corresponding set of desirability scores by: providing the set of face images to the unique individual; and guiding the unique individual to label each of the set of face images with a desirability score based on the unique individual's inherent ability of judging a face as desirable or undesirable.

In some embodiments, the desirability score for a given face image in the set of face images is one of a set of discrete values representing different degrees of desirability toward the given face image.

In some embodiments, for a particular group of individuals, the set of face images is substantially identical for each individual in the group of individuals, while the set of desirability scores is different for different individuals in the group of individuals.

In some embodiments, the DL neural network includes a convolution neural network (CNN), and the set of features includes a set of pre-defined filters representing a set of pre-defined facial features. Hence, training the CNN using the set of face images includes training a set of weights associated with the set of pre-defined facial features.

In some embodiments, the set of features additionally includes a set of unspecified filters, each of the set of unspecified filters includes a set of trainable parameters. Hence, training the CNN using the set of face images additionally includes training the set of trainable parameters in the set unspecified filters to construct the set unspecified filters for the unique individual.

In some embodiments, after generating the personalized face perception model, the process applies the personalized face perception model to a large number of new face images to select desirable face images among the new face images on behalf of the unique individual with very high accuracy, thereby preventing the unique individual from personally screening the large number of new face images.

In some embodiments, the process applies the personalized face perception model to the large number of new face images by: receiving each new face image as an input to the personalized face perception model; generating a like/dislike decision or a desirability score for the new face image on behalf of the unique individual using the trained DL neural network; and if the new face image is determined with a like decision or to be desirable, providing the new face image to the unique individual as a personalized recommendation.

In some embodiments, the process further includes the steps of: receiving a user decision on the recommended new face image from the unique individual; and updating the personalized face perception model using the new face image and the associated user decision as a part of new training data.

In some embodiments, the process further includes the steps of: generating a plurality of personalized face perception models for a plurality of individuals, wherein each of the plurality of personalized face perception models corresponds to each of the plurality of individuals, and wherein each of the plurality of personalized face perception models generates a desirability score for an input face image on behalf of the corresponding individual, and wherein the desirability score has a value from a set of discrete values representing different degrees of desirability; applying the plurality of personalized face perception models to a given face image to generate a set of desirability scores for the plurality of individuals; and computing an overall desirability score for the given face image by averaging the set of desirability scores, wherein the overall desirability score measures an overall degree of desirability for the given face image of the plurality of individuals.

In another aspect, a personalized face perception system is disclosed. This personalized face perception system includes a face perception model training subsystem (or "model training subsystem") which further includes a deep learning (DL) neural network. This DL neural network includes a set of features and a set of parameters associated with the set of features. In some embodiments, the face perception model training subsystem is configured to: receive a set of face images and a corresponding set of desirability scores, wherein each of the desirability scores represents a degree of desirability toward an associated face image provided by an individual based on the individual's perception of a desirable face; train the DL neural network using the set of face images as inputs to the DL neural network and the corresponding set of desirability scores as outputs of the DL neural network to generate a personalized face perception model for the individual, wherein the personalized face perception model includes a trained set of parameters which is unique to the individual. The personalized face perception system further includes a face image processing subsystem coupled to the face perception model training subsystem. In some embodiments, the face image processing subsystem is configured to: receive the personalized face perception model from the face perception model training subsystem; receive a set of new face images from an external source; and applying the personalized face perception model to the set of new face images to select desirable face images among the set of new face images on behalf of the individual with very high accuracy, thereby preventing the individual from personally screening the set of new face images.

In some embodiments, prior to receiving the set of face images and the corresponding set of desirability scores, the face perception model training subsystem is further configured to generate the corresponding set of desirability scores by: providing the set of face images to the unique individual; and guiding the unique individual to label each of the set of face images with a desirability score based on the unique individual's inherent ability of judging a face as desirable or undesirable.

In some embodiments, the face image processing subsystem is configured to apply the personalized face perception model to a large number of new face images to select desirable face images among the new face images on behalf of the unique individual with very high accuracy, thereby preventing the unique individual from personally screening the large number of new face images.

In some embodiments, the face image processing subsystem applies the personalized face perception model to the large number of new face images by: receiving each new face image as an input; generating a like/dislike decision or a desirability score for the new face image on behalf of the unique individual using the trained DL neural network; and if the new face image is determined with a like decision or to be desirable, providing the new face image to the unique individual as a personalized recommendation.

In some embodiments, the face perception model training subsystem is further configured to: receive a user decision on the recommended new face image from the unique individual; and update the personalized face perception model using the new face image and the associated user decision as a part of new training data.

In some embodiments, the face perception model training subsystem is further configured to generate a plurality of personalized face perception models for a plurality of individuals. Each of the plurality of personalized face perception models corresponds to each of the plurality of individuals, and each of the plurality of personalized face perception models generates a desirability score for an input face image on behalf of the corresponding individual, and the desirability score has a value from a set of discrete values representing different degrees of desirability.

In some embodiments, the face image processing subsystem is further configured to: apply the plurality of personalized face perception models to a given face image to generate a set of desirability scores for the plurality of individuals; and compute an overall desirability score for the given face image by averaging the set of desirability scores, wherein the overall desirability score measures an overall degree of desirability for the given face image of the plurality of individuals.

In yet one aspect, a process for constructing and using a personalized face perception model for a unique individual is disclosed. This process includes the steps of: receiving a set of face images and a corresponding set of desirability scores, wherein each of the desirability scores represents a degree of desirability toward an associated face image provided by an individual based on the individual's perception of a desirable face; receiving a personalized face perception model based on a deep learning (DL) neural network, wherein the DL neural network includes a set of features and a set of parameters associated with the set of features; training the personalized face perception model using the set of face images as inputs to the DL neural network and the corresponding set of desirability scores as outputs of the DL neural network to generate a trained personalized face perception model for the individual, wherein the trained personalized face perception model includes a trained set of parameters which is unique to the individual; and applying the trained personalized face perception model to a set of new face images to select desirable face images among the set of new face images on behalf of the individual with very high accuracy, thereby preventing the individual from personally screening the set of new face images.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Throughout the specification, terms "a user", "a person", "an individual" "a given user", "a given person", "a unique user", 'a unique person", and "a unique individual" are used interchangeably to mean a particular person in the world who differentiates from another person in the world by a unique set of physical and mental characteristics possessed by that particular person.

People react to a facial image or face photo (terms "facial/face image/photo" are used interchangeably hereinafter) in an emotional manner. Typically, a visual encounter of a desirable human face generates a positive reaction, whereas an undesirable face triggers a negative reaction. The ability to define a face as either desirable or undesirable is inherent in human nature, and is highly personal. Such definition is the product of millions of encounters and impressions in a person's lifetime, which evolves with time.

While it is well-known that the ability to define a face as desirable or undesirable exists in every one of us, it is extremely difficult to quantify such ability. For each individual, the perception of "beauty" is generated by a combination of many tangible and intangible factors. For example, facial geometry, shapes of the eyes and noses are some of the tangible factors. Some intangible factors include a person's prior encounters and emotional experiences, media influences, and peer pressure. All these tangible and intangible factors within a person's brain lead to a highly individualized decision mechanism which is subconsciously applied to each new encounter of that person.

Efforts are made to simulate this decision mechanism by online dating services and Apps. One approach is to create profile models for individuals that capture facial features based on user-provided profile photos, and compare these profile models with attributes provided by the users to look for matches (as in the case of Match.com). In some cases, these attributes are provided in a descriptive form, such as in verbal description. In some other cases, certain benchmarks are used, such as by providing photos of user's exes. However, the problem with this approach is that it is extremely difficult for any person to accurately and sufficiently describe what he or she perceives as a desirable face in a descriptive manner such as in words and/or with a limited number of photos.

Another approach involves using machine learning in conjunction with a large quantity of data. Dating platform such as Tinder™ can provide services for users to screen potential candidates. A user will go through candidates and make a decision on each candidate with a like or dislike action. This human process can be sped up with better recommendations when enough data are studied, and recommendations can become more accurate which generates higher conversion rate. Unfortunately, this recommendation platform is based on algorithms that target different categories of users rather than individual users. Such a platform has an incentive to keep users active by constantly generating "good enough" recommendations rather than highly likely candidates. In other words, this platform is more likely to provide users with candidates at 70% compatibility without a motivation to strive for 95% or higher compatibility.

As mentioned above, the propensity to "like" or "dislike" someone based on facial characteristics is the result of years of interaction with and observation of tens of thousands up to millions of faces in one's lifetime. Hence, it can be reasonably assumed that each person builds his/her mental model for making such decisions through an actively training process. Empirical evidence shows that people tend to follow certain patterns when it comes to "likes" or "dislikes." For example, the phenomenon that a person is more inclined to date someone who looks like his/her ex indicates that people tend to look for partnership with an established set of facial features.

Consequently, it can be concluded that at any given time in a person's lifetime, the person possesses a mental model having a specific set of "features," wherein this person consciously or subconsciously applies this mental model to "classify" faces in real life encounters or in imagery forms as desirable or undesirable based on the associated set of features. More specifically, this mental model can have the following properties. First, the mental model is highly personalized or individualized, that is, at any give time there is one unique model for a given person that is different from a mental model of another person. Second, this mental model is trained and evolves with time. In other words, each mental model is a result of a training process particular to a given person's unique life experiences. Third, the mental model is defined by a set of features, and the model makes decisions on each face through a feature matching process.

Disclosed are various embodiments of an artificial intelligence (AI)/Deep learning (DL)-based face perception engine for constructing and providing a highly-personalized face perception model for a unique individual through a deep learning process. In some embodiments, a disclosed face perception engine includes a DL neural network (also referred to as "deep neural network"), such as a convolution neural network (CNN) configured for training a personalized face perception model for the unique individual based on a standard set of training images and a corresponding set of decisions on the set of training images provided by the unique individual. Moreover, the deep neural network used to implement the disclosed face perception engine can include an imageNet-based deep learning framework such as VGGNet, ResNet, DenseNet, Dual Pathway Network, MobileNet or Inception v1-v3.

When sufficiently trained using the standard set of training images and the corresponding set of decisions, the personalized face perception model for the unique individual perceives a new face photo/image as if through the eyes of that unique individual. Hence, the trained face perception model can be used an "agent" or "representative" of the associated person in making very personal decisions, such as to decide if a given face photo/image includes a desirable face in the eyes of that person. Moreover, the trained face perception model can be built into various applications and used across various platforms, including online dating services and mobile dating Apps, as well as content delivery services, advertisement services, entertainment Apps, and other types of recommendation engines.

When implemented within an online dating service or a mobile dating App, a trained face perception model for a given user can be applied to a large number of profile photos to select those desirable profile photos on behalf of the given user with very high accuracy, and subsequently presenting the selection results to the given user for final selection. In doing so, the user no longer needs to personally, constantly and one-by-one screen the large number of profile photos to filter out often times just a few desirable profiles in a very time-consuming manner. The proposed face perception engine ensures that the recommended profiles by the personalized face perception model represent the choices that would have been made by the given user if the user had screen the same set of profile photos. Moreover, the personalized face perception model can be a dynamic model which is constantly updated based on the user's decisions on the recommended profile photos as well as new training images, whereby keeping the face perception model up to date with user's change in preferences.

In some embodiments, the proposed personalized face perception engine includes a face perception model training subsystem (e.g., face perception model training subsystem 302 in FIG. 3) configured to generate the aforementioned personalized perception model for each unique user. More specifically, the face perception model training subsystem can include a deep-learning (DL) neural network (also referred to as "deep neural network" or "DNN" hereinafter, e.g., DNN 305 in FIG. 3), such as a CNN. The proposed DNN can include a set of processing (or hidden) layers, and each of the processing layers can include a set of filters (i.e., neurons). When the proposed DNN is implemented with a CNN, the set of processing layers includes a set of convolution layers, and each of the set of convolution layers includes or is composed of a set of filters and the associated weight parameters. For a given convolution layer, the set of associated filters can be a set of facial features having a similar complexity. For example, when the disclosed face perception model is implemented with a CNN, a shallower (i.e., a lower numbered) layer in the CNN can include filters for identifying simpler features such as edges and curves. A deeper (i.e., a higher numbered) layer in the CNN can include filters for identifying more complex facial features such as shapes of eyes, noses, mouths, eyebrows, etc. An even deeper layer can include filters for identifying even more complex features or combination of features including facial geometries, e.g., geometrical relationships among different facial objects. Note that the above described filters/features represent different classes of identifiable characteristics of a human face or a combination of the identifiable characteristics of a human face.

In some embodiments, to train the DNN within the proposed face perception model training subsystem for a given user (i.e., a given person or a unique individual), the face perception model training subsystem receives a set of training face images, and a corresponding set of decisions (i.e., a set of labels) on the set of training face images from the given user. More specifically, for each training face image in the set of training face images, a corresponding decision in the set of decisions is a desirability score provided by the given user based on that user's own perception of face desirability. In other words, prior to training a new face perception model for a new user, the new user is instructed to personally label/classify each training image in the set of training face images by making a decision on the training image, i.e., providing a classification of the training image in terms of a degree of desirability. Hence, the user-provided classification of the training image can be referred as a "desirability score."

For example, the desirability score for a given training face image can have only two values/classifications: 0 being undesirable and 1 being desirable. As another example, the desirability score can have three values/classifications: 0 being undesirable; 1 being uncertain; and 2 being desirable. As yet another example, the desirability score can have four values/classifications: 0 being highly undesirable; 1 being somewhat undesirable; 2 being somewhat desirable; and 3 being highly desirable. As yet another example, the desirability score can have five values/classifications: 0 being highly undesirable; 1 being somewhat undesirable; 2 being uncertain; 3 being somewhat desirable; and 4 being highly desirable. As yet another example, the desirability score can have ten values/classifications (i.e., the so-called "one-to-ten" rating): with 1 being highly undesirable and 10 being highly desirable, and each of the other 8 values represents a different degree/level of desirability which gradually increases from 1 to 10. Note that typically the more values/classifications the desirability score includes, the more accurately the desirability score can be used to reflect the user's perception. However, above certain levels, it becomes difficult for a user to make a more meaningful decision for a given face image. Moreover, more levels also leads to more time spent by the user to make the decision which can lead to negative user experience.

Hence, after the given user has made the decisions on the set of training images, the set of images becomes uniquely "labeled." Subsequently, the face perception model training subsystem receives the set of labeled training images as ground truth and a DNN model training process can be initiated and carried out using the training images as inputs and the associated labels as training targets/outputs. Note that while the training data may be similar or identical for different users, the training targets/outputs are different for different users because for each training image the training target/output includes a unique decision made by a given person (i.e., in the form of the desirability score). Hence, the more training images are used, the more personal decisions/training data are received and used to build each face perception model, thereby further differentiating one face perception model from another face perception model among a large number of face perception models constructed for a large number of people. Consequently, one key difference of the proposed personalized face perception engine from a conventional DL-based profile recommendation system is that, the proposed face perception model training subsystem is used to generate a highly-personalize model for each individual by training the model based on the set of highly personalized decisions (i.e., personalized desirability scores) instead of generating a generalized or semi-generalized model for a group of users based on a set of standard classifications of the group of users (such as sex, age, geographical location, etc.).

As mentioned above, the proposed face perception model training subsystem can use a DNN including many layers of identifiable features. In other words, the sets of filters/features used by a proposed DNN can be pre-defined filters/features for understanding human faces. As such, a trained face perception model for a unique individual can include sets of trained weights and biases associated with the sets of the pre-defined filters/features. However, it can be reasonably assumed that a perception/mental model of a unique individual can also include features which cannot be represented by geometrical parameters and combinations thereof. These features can be highly abstract and person-specific. However, these features can be learned through the above-described DNN training process in one or more deeper layers of the DNN. In some embodiments, to identify such hidden perception/mental features within a person's brain, one or more layers of the DNN can be used to include filters/features which are represented by/constructed with trainable parameters rather then fixed values. Hence, training a face perception model for an individual can also include regressing and obtaining the values of these trainable filters/features along with the weights and biases of those pre-defined filters/features. As a result, establishing a new face perception model for a given individual can include extracting a set of features particular to that individual, and the differences from one model for a user A to another model for a user B can include both different weights and biases for sets of standardized filters/features typically used for face recognition and different custom-trained and extracted filters/features.

In some embodiments, after a new face perception model has been established, the set of extracted features unique to the individual can be fixed during the time when the model is updated for that individual with new images, and only the weights and biases of these new features need to be updated. However, in some embodiments of the proposed face perception model training subsystem, the DNN only uses pre-define filters/features and as such the differences from one trained model for a user A to another trained model for a user B lie primarily in the different weights and biases associated with these pre-define filters/features.

While it is possible to use the same standard set of training images to train different models for different individuals, in practice different standard sets of training images can be used for different groups of users based on one or more classifications. For example, for a male user looking for a female match, it is not necessary to train the model of the male user using male profile images, and vice versa. In other words, the training image set can be a more targeted set for a particular group of users, and the user-provided attributes can be used to narrow down the training dataset, for example, based on sexual orientations and ages. In doing so, not only users require to do much less work labeling the training data, but the training process becomes much faster and more accurate. Nevertheless, in the proposed system and technique, a same set of training images can be used to establish an unlimited number of unique face perception models for an unlimited number of people by training a particular DNN model, wherein each of the face perception models can be trained to become an accurate decision model of face desirability for each unique person. In some embodiments, trained face perception models can be updated later on by providing more training face images to the users. In these embodiments, the users label the newly provided training images by making desirability decisions on these images, and the DNN is trained and updated based on both the previously labeled training images and newly labeled training images. Because using more training images typically generates more accurate models, in practice, the training images can be provided to the users several time instead of all at once to reduce the time required to label training images at a given time, particularly when the training data set is large.

Figure 1:
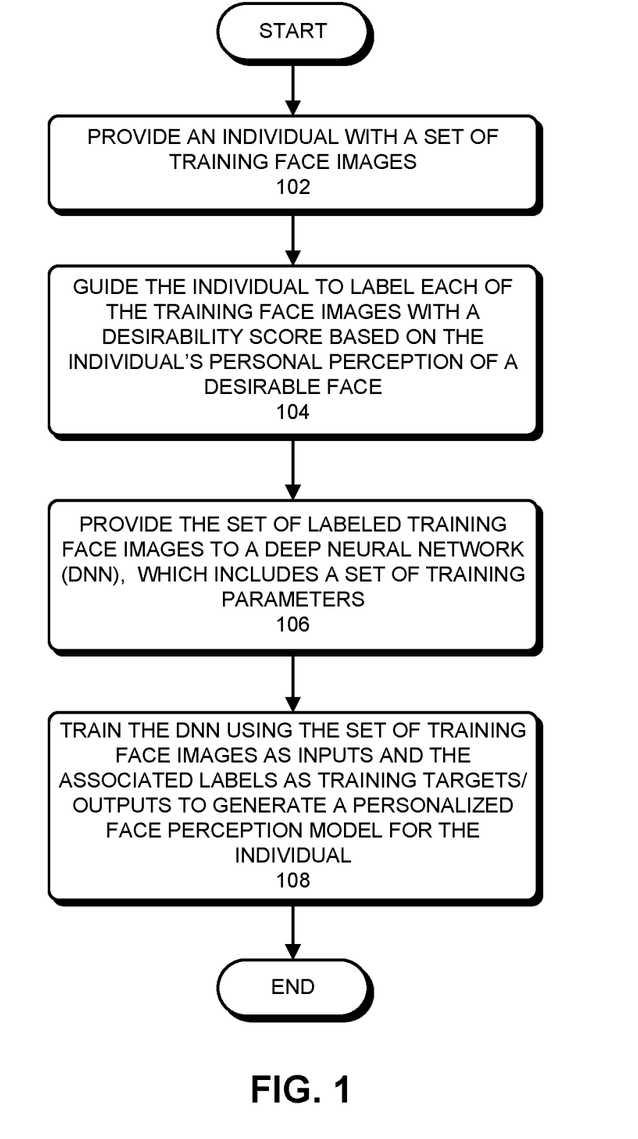
FIG. 1 presents a flowchart illustrating a process of constructing a face perception model for an individual in accordance with some embodiments described herein.

FIG. 1 presents a flowchart illustrating a process of constructing a face perception model for an individual in accordance with some embodiments described herein. In some embodiments, the process begins by providing an individual with a set of training face images (step 102). As mentioned above, the set of training face images can be determined for the individual based on the attributes of the individual, so that a group of individuals having the same or similar attributes can be provided with the same or similar set of the training face images. In one embodiment, the set of training face images is composed of a set of profile photos provided by a group of volunteers or by a group of incentivized people. The size of the set of training face images can be in the range of 100-1000 images but can also be less than 100 images or greater than 1000 images. For example, the set of training images can include 250 images.

Next, the process guides the individual to label each of the training face images with a desirability score based on the individual's personal perception of a desirable face (step 104). As mentioned above, the desirability score can have two or more desirability levels, and the set of the desirability levels represent the set of classifications for the DNN. Next, the process provides the set of labeled training face images to a DNN face-perception model (or "DNN model"), such as a multi-stage CNN model, which includes a set of training parameters (step 106). In some embodiments, the DNN model can include an imageNet-based deep learning framework such as VGGNet, ResNet, DenseNet, Dual Pathway Network, MobileNet or Inception v1-v3.

As mentioned above, a subset of the training parameters can be included in a subset of filters/features of the DNN model which have not been previously defined, and the subset of undefined filters/features can be included in one or more DNN layers and subsequently fitted/determined through the model training process. In some embodiments, prior to performing step 106 based on the set of uniquely labeled training face images from the individual, the DNN model for the individual can be pre-trained or semi-trained before receiving. Note that the pre-training of the DNN model can be different for different individuals.

Next, the DNN model for the individual is trained using the set of training face images as inputs and the associated desirability scores/labels as training targets/outputs to generate a personalized face perception model for the individual (step 108). In some embodiments, the trained/established personalized face perception model for the individual includes trained sets of weights and biases associated with sets of pre-defined facial filters/features. In some other embodiments, the trained/established personalized face perception model for the individual additionally includes new/personalized filters/features which were not previously-defined but trained and established for the individual through the model training process.

Figure 3:
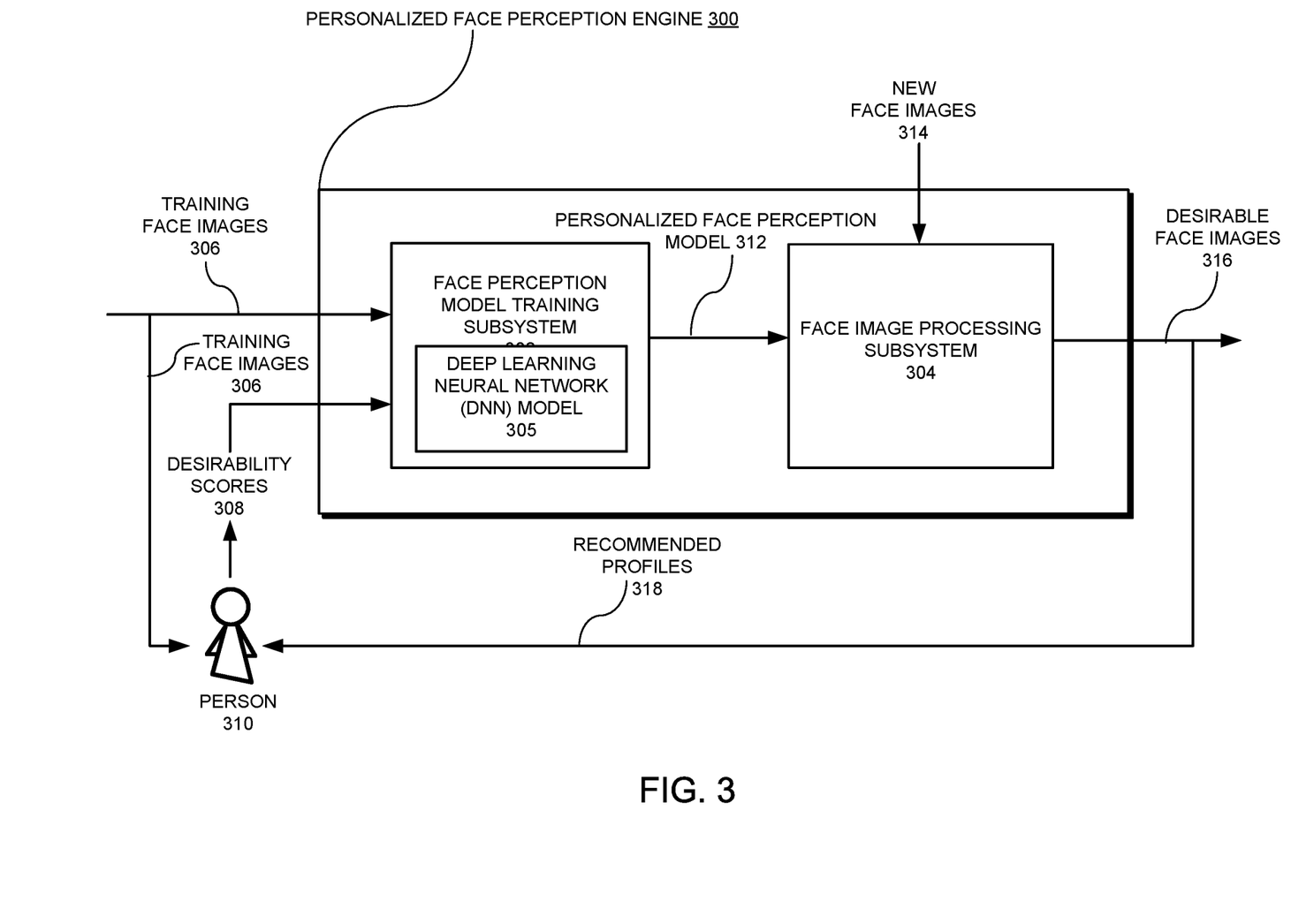
FIG. 3 illustrates a block diagram of an exemplary personalized face perception engine in accordance with some embodiments described herein.

The proposed personalized face perception engine also includes a face image processing subsystem (e.g., face image processing subsystem 304 in FIG. 3). More specifically, once a face perception model is constructed for an individual, the disclosed face image processing subsystem can be configured to apply the face perception model to real world face images on behalf of the associated individual. More specifically, the face perception model includes a trained-DNN having established features/filters, weights and biases, and can be applied to a large number of face images to generate desirability scores or simple "like" or "dislike" decisions through a deep learning process on behalf of the individual. For example, when implemented in an online dating service or a mobile dating App, the disclosed face image processing subsystem can use the established DL face perception model to process profile photos with extremely high accuracy because each model was constructed specifically for a unique user. Next, those profile photos determined to be desirable to the unique user can be provided to the user as personalized recommendations. The user can then make final selections among a very manageable set of profile photos, wherein each of the profile photo already has a very high likelihood of being selected by the user him/herself. In some embodiments, the face perception model can be updated/re-trained later on based on the user's decisions on the recommended set of profile photos, which can be combined with new/additional training images as mentioned above. In this manner, the disclosed face perception model established for a unique individual can be dynamic, i.e., evolve over time to adapt to the individual and be kept up to date with the individual user's change in preferences/perceptions of human faces.

Note that the disclosed face perception model training process of FIG. 1 does not need to be performed and completed in a "one-off" manner for the entirely set of training images. If the training image set is large (e.g., with 500 images), asking a new user to label all of the training images all at once can cause user fatigue and can lead to poor user experiences. In some embodiments, the training process can be performed and completed in "pieces" over a number of times over a predetermined time period, e.g., 5 times over a few days, 10 time over a week, or 30 times over a month. For each "piece" of the training, a subset of the training image set (e.g., 1/10 of the image set in a 10-step training process) can be provided to the user for labeling and the model can be partially trained based on the always labeled training images. Note that in these staged-training embodiments, the training data is accumulative and each time a set of new training images has been labeled, the model can be re-trained with these newly-labeled training images and all of the preciously labeled training images from the previous stages of the training process. However, in other embodiments, each time when a new set of images has been labeled, the partially-trained model is only updated with the newly-labeled training images instead of being re-trained with all of currently labeled training images from the current and previous training stages. Note that the disclosed face perception model can also be periodically re-trained with the same training data set, but combined with "new" or "updated" user decisions/labels provided by the user on the same training data set, so that the re-trained face perception model can capture user's progression or change in perception of desirable faces over time.

Figure 2:
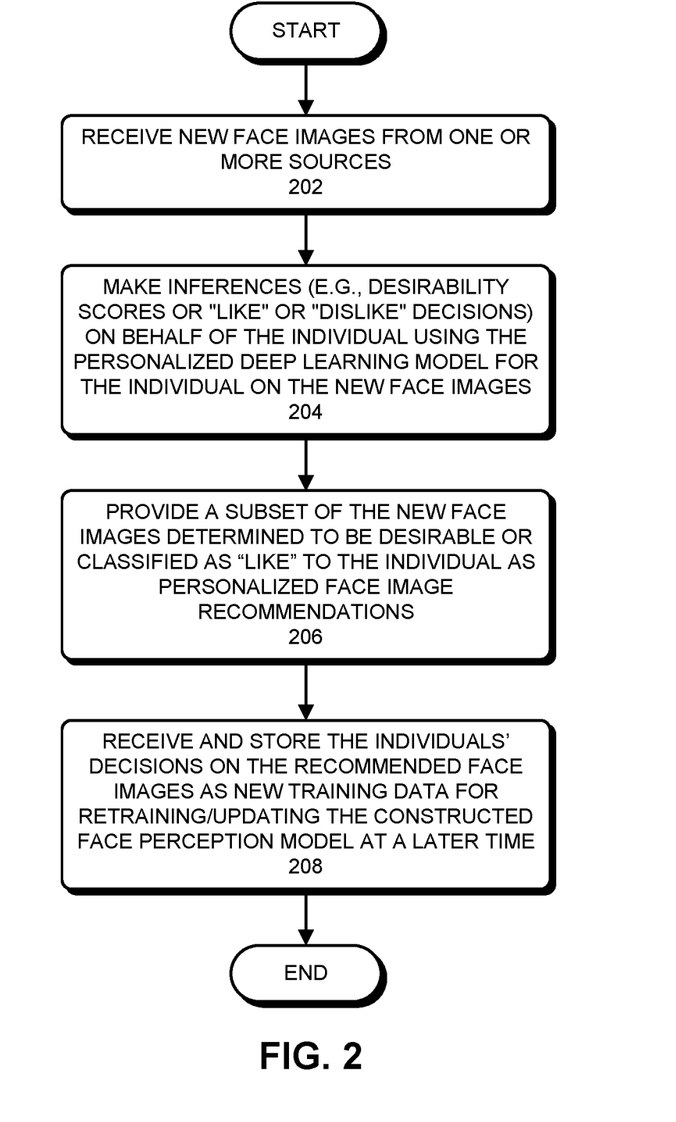
FIG. 2 presents a flowchart illustrating a process of processing face images using the constructed face perception model for the associated individual in accordance with some embodiments described herein.

FIG. 2 presents a flowchart illustrating a process of processing face images using the constructed face perception model for the associated individual in accordance with some embodiments described herein. In some embodiments, the process begins by receiving new face images from one or more sources (step 202). For example, the new face images can be profile photos newly submitted/uploaded onto an online dating service or a mobile dating App. However, if the individual/user is new to the online dating service or the mobile dating App, the new face images can be any profile photos in the profile photo database that have not previously been processed on behalf of the individual/user. Next, the process makes inferences on behalf of the individual using the personalized DL face perception model for the individual (e.g., which was trained using the described model training process of FIG. 1) on the received new face images (step 204). For example, the personalized face perception model can generate desirability scores or make "like" or "dislike" decisions on behalf of the individual on the received new face images.

The process subsequently provides a subset of the set of new face images determined to be desirable or classified as "like" to the individual as personalized face image recommendations (step 206). For example, the process can classify a processed image as a desirable image if the inferred/determined desirability score by the personalized face perception model for that image is above a predetermined threshold (e.g., 7 in a 1-10 scale). Note that the individual receiving the recommended face images from the proposed system can then rate the recommended face images by assigning desirability scores or making "like" or "dislike" decisions on these images. Because the size of the recommended face images can be quite small and manageable and the images are in compliance with the individual's preference/perception, the individual receiving the recommended face images is highly likely to react positively to the recommendations, e.g., by rating the recommended face images. Next and optionally, the process can receive and store the individual's ratings/decisions/selections on the recommended face images as new training data for re-training/updating the constructed face perception model at a later time (step 208).

Note that the proposed desirability scores can be used to learn and quantify human emotional preferences and emotional states beyond the simple "like" or "dislike" decisions. For example, when using the disclosed face perception model training subsystem to train a face perception model for a given user, the training face photos can be rated with a set of discrete levels (e.g., the desirability score with values from 1 to 10) and thus be classified into a set of ranking categories based on the scores these training photos have received. Next, when the disclosed face image processing subsystem is used to make inferences, each new face image/photo can be scored with one of the set of discrete levels (e.g., by selecting a discrete level having the highest probability in the outputs) based on the leaned emotional preference of the given user. This ranking score becomes a numerical measure of the preference level for each new photo of the given user predicted by the proposed face perception model.

The above-described automatic inference/ranking and scoring feature can have significant implications. For example, it is possible to use a trained face perception model for a given user to rank any face image, not just the ones within an online dating system/App. More specifically, when a specific set of photos is scored by the trained face perception model for the given user, the generated ranking scores can reveal information related to the user preference which was previously unknown to the user and can be extremely valuable for the proposed personalized perception system. Moreover, each photo can be ranked and scored by a group of trained face perception models for a group of users, and subsequently an overall ranking score of that photo based on the collective decisions of the group of users can be generated (e.g., by computing an average score). This overall ranking score representing an overall preference level of the group of people can then be used for various advertising and marketing purpose.

Note that the above-described technique of using the proposed personalized face perception engine to automatically classify/rate/rank photos to infer the preference of an individual and the preference of groups of people is not limited to face photos. The same technique can be extended to other types of photos and images. For example, when the technique is used to process a photo of a particular fabric product (i.e., after personalized preference DL models on fabric images for a large number of people have been established), the disclosed system and technique can be used to automatically infer preference levels on a particular fabric product for individuals and/or for groups of people, without having to have the individuals or the group of people to look at the photo.

FIG. 3 illustrates a block diagram of an exemplary personalized face perception engine 300 for implementing the above-described personalized face perception engine in accordance with some embodiments described herein. As can be seen in FIG. 3, personalized face perception engine 300 includes a face perception model training subsystem 302 coupled to a face image processing subsystem 304. Face perception model training subsystem 302 further includes a DNN model 305. In some embodiments, face perception model training subsystem 302 receives a set of training face image 306 and a corresponding set of desirability scores 308 provided by a person 310 (e.g., a paid user of an online dating service) on the set of training face image 306 based on person 310's perception, and subsequently uses the set of training face image 306 as inputs to DNN model 305 and the set of desirability scores 308 as targets/outputs of DNN model 305 to train DNN model 305 for person 310. Face perception model training subsystem 302 subsequently generates and outputs a personalized face perception model 312, i.e., the uniquely trained DNN model 305 for person 310. In some embodiments, face image processing subsystem 304 receives trained personalized face perception model 312 and a set of new face images 314 from one or more sources, and automatically processes the set of new face images 314 using personalized face perception model 312 to infer desirability scores for the set of new face images 314 and select a set of desirable face images 316 among the set of new face images 314 on behalf of person 310 with extremely high accuracy. Face image processing subsystem 304 subsequently provides a set of recommended profiles 318 based on the set of selected desirable face images 316 to person 310, which then makes further selections among the set of recommended profiles 318.

In some embodiments, at least a portion of personalized face perception engine 300 can be implemented on a deep-learning-specific hardware platform, including, but not limited to a graphic processing unit (GPU), a tensor processing unit (TPU), an intelligent processor unit (IPU), a digital signal processor (DSP), a field-programmable gate array (FPGA), and an application-specific integrated circuit (ASIC).

Note that the various embodiments of the above-described personalized face perception engine, including personalized face perception engine 300 in FIG. 3 can be implemented in various hardware environments. In some embodiments, the disclosed face perception model training subsystem of the personalized face perception engine can be implemented on a cloud server (e.g., Microsoft, Amazon, or Google cloud servers) whereas the disclosed face image processing subsystem of the personalized face perception engine can be implemented directly on terminal devices, such as smart phones/tablets/laptops of the end users. In these embodiments, after the model training process, a constructed personalized face perception model for a given user, such as face perception model 312 can be downloaded from the cloud server to a terminal device of that user, such as a smartphone of person 310.

In some embodiments, the disclosed face perception model training subsystem of the personalized face perception engine can be implemented on the servers of the online dating or mobile dating service providers, whereas the disclosed face image processing subsystem of the personalized face perception engine can be implemented directly on terminal devices of the end users. In these embodiments, after the model training process, a constructed personalized face perception model for a given user, such as face perception model 312 can be downloaded from a main server of a dating service provider to a terminal device of that user, such as a smartphone of person 310.

In some embodiments, both the disclosed face perception model training subsystem and the disclosed face image processing subsystem of the personalized face perception engine can be implemented directly on terminal devices of the end users, provided that such terminal devices are capable of performing required DL-based training and computations. According to these embodiments, the entire personalized face perception engine 300 can be implemented on a terminal device of person 310. In some other embodiments, both the disclosed face perception model training subsystem and the disclosed face image processing subsystem of the personalized face perception engine, such as personalized face perception engine 300 can be implemented on a cloud server or on a main server of a dating service provider.

Figure 4:
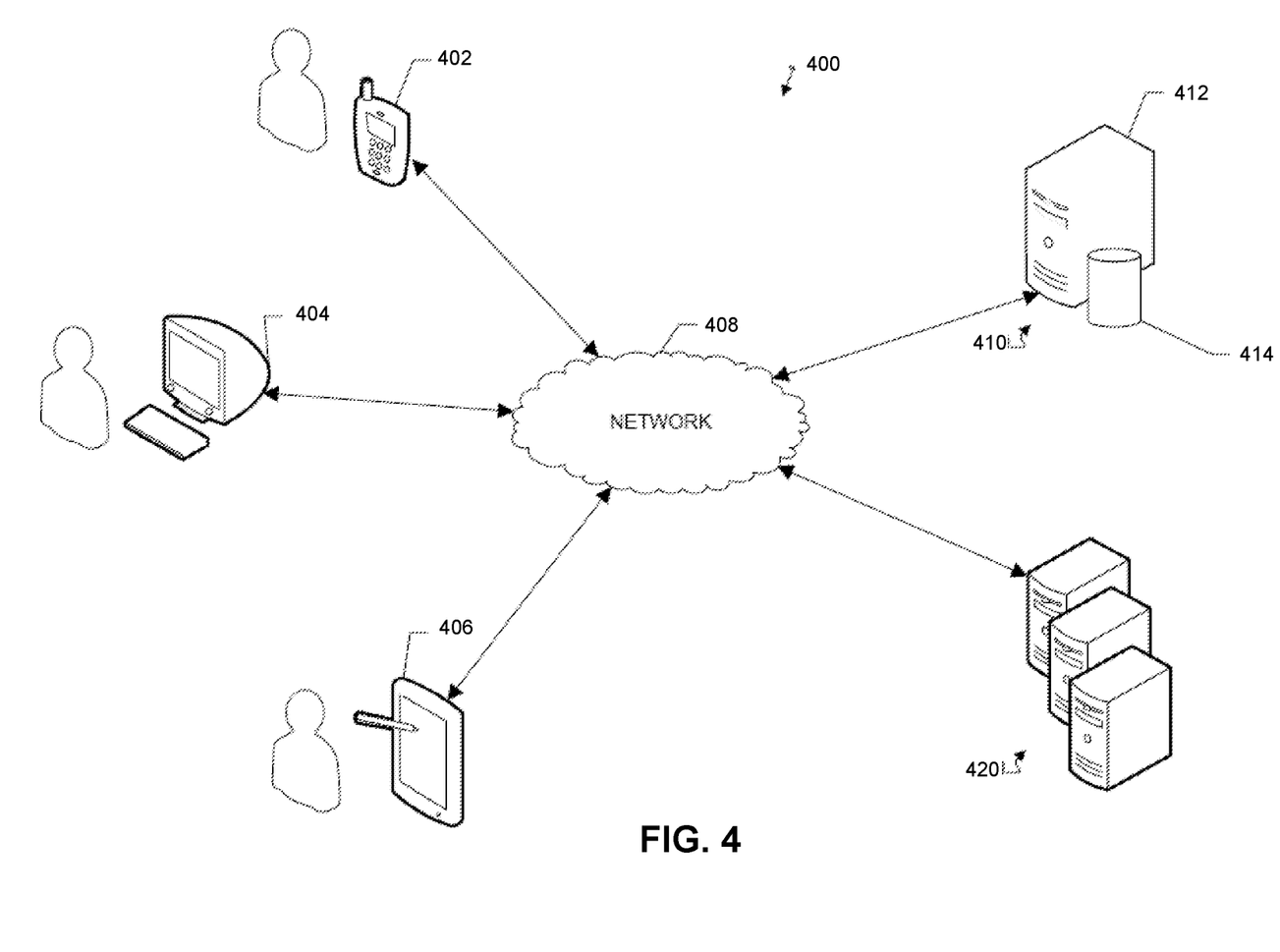
FIG. 4 illustrates an example network environment which provides for implementing the disclosed personalized face perception engine in accordance with some embodiments described herein.

FIG. 4 illustrates an example network environment which provides for implementing the disclosed personalized face perception engine in accordance with some embodiments described herein. A network environment 400 includes a number of electronic devices 402, 404 and 406 communicably connected to a server 410 by a network 408. One or more remote servers 420 are further coupled to the server 410 and/or the one or more electronic devices 402, 404 and 406.

In some example embodiments, electronic devices 402, 404 and 406 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 402, 404 and 406 store a user agent such as a browser or application. In the example of FIG. 4, electronic device 402 is depicted as a smartphone, electronic device 404 is depicted as a desktop computer, and electronic device 406 is depicted as a PDA.

Server 410 includes a processing device 412, which can include one or more graphic processing units (GPUs), and a data store 414. Processing device 412 executes computer instructions stored in data store 414, for example, for training, generating and updating a personalized face perception model for a user of electronic devices 402, 404 and 406 for online dating or mobile dating applications.

In some example aspects, server 410 can be a single computing device such as a computer server. In other embodiments, server 410 can represent more than one computing device working together to perform the actions of a server computer (e.g., cloud computing). The server 410 may host the web server communicably coupled to the browser at the client device (e.g., electronic devices 402, 404 or 406) via network 408. In one example, the server 410 can be used to implement one or both of the face perception model training subsystem and the face image processing subsystem of the disclosed personalized face perception engine in conjunction with FIGS. 1-3. Server 410 may further be in communication with one or more remote servers 420 either through the network 408 or through another network or communication means.

The one or more remote servers 420, which can include a cloud server, may perform various functionalities and/or storage capabilities described herein with regard to the server 410 either alone or in combination with server 410. Each of the one or more remote servers 420 may host various services. In one example, a remote cloud server 420 can be used to implement one or both of the face perception model training subsystem and the face image processing subsystem of the disclosed personalized face perception engine.

Server 410 may further maintain or be in communication with social networking services hosted on one or more remote server 420. The one or more social networking services may provide various services and may enable users to create a profile and associate themselves with other users at a remote social networking service. The server 410 and/or the one or more remote servers 420 may further facilitate the generation and maintenance of a social graph including the user created associations. The social graphs may include, for example, a list of all users of the remote social networking service and their associations with other users of a remote social networking service.

Each of the one or more remote servers 420 can be a single computing device such as a computer server or can represent more than one computing device working together to perform the actions of a server computer (e.g., cloud computing). In one embodiment server 410 and one or more remote servers 420 may be implemented as a single server or across multiple servers. In one example, the server 410 and one or more remote servers 420 may communicate through the user agent at the client device (e.g., electronic devices 402, 404 or 406) via network 408.

Users may interact with the system hosted by server 410, and/or one or more services hosted by remote servers 420, through a client application installed at the electronic devices 402, 404, and 406. Alternatively, the user may interact with the system and the one or more social networking services through a web based browser application at the electronic devices 402, 404, 406. Communication between client devices 402, 404, 406 and the system, and/or one or more services, may be facilitated through a network (e.g., network 408).

Communications between the client devices 402, 404, 406, server 410 and/or one or more remote servers 420 may be facilitated through various communication protocols. In some aspects, client devices 402, 404, 406, server 410 and/or one or more remote servers 420 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

The network 408 can include, for example, any one or more of a personal area network (PAN), a local area network (LAN), a campus area network (CAN), a metropolitan area network (MAN), a wide area network (WAN), a broadband network (BBN), the Internet, and the like. Further, the network 408 can include, but is not limited to, any one or more of the following network topologies, including a bus network, a star network, a ring network, a mesh network, a star-bus network, tree or hierarchical network, and the like.

A face perception engine which is configured to construct highly-accurate and individualized face perception model for each unique individual, wherein the constructed face perception model is subsequently used an agent of that individual for making desirability decisions on face images is proposed. When making desirability decisions, the constructed face perception model can be a substantially identical representation of the given user. The model takes photo images of human faces as inputs, analyzes each photo in the associated deep learning structure, and generates a "like" or "dislike" decision just as that user would have made. A perfectly trained face perception model should behave exactly like the associated user him/herself, meaning the model makes decisions on face images with nearly 100% likelihood as the user him/herself.

The proposed face perception engine allows a user to visualize and better understand his/her personal preferences when it comes to face attractiveness. The proposed face perception engine offers a cost-effective way ("cost" includes time and money) to find a match (i.e., a date in dating services and Apps). The proposed face perception engine provides a natural way of generating data of user preferences, wherein the data can include those features that are very difficult or impossible to describe, and therefore not collected in the past.

In addition to the above-described application in dating services and Apps, the proposed face perception engine also provides a mechanism for constructing highly individualized models and agents for other highly personal applications including, but not limited to content delivery, targeted advertisement, and building personal entertainment agents. Each application model can be constructed with very high accuracy for the associated individual because the model is constructed primarily based on the knowledge of that specific individual.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A computer-implemented method of constructing a personalized face perception model for a unique individual, the method comprising:
   receiving a set of face images and a corresponding set of desirability scores, wherein each of the desirability scores represents a degree of desirability toward an associated face image provided by the individual based on the individual's perception of a desirable face;
   providing the set of face images and the corresponding set of desirability scores to a deep learning (DL) neural network, wherein the DL neural network includes a set of features and a set of parameters associated with the set of features; and
   training the DL neural network using the set of face images as inputs and the corresponding set of desirability scores as outputs to generate a personalized face perception model for the unique individual, wherein the personalized face perception model includes a trained set of parameters which is unique to the unique individual,
   wherein the personalized face perception model is used to automatically infer a desirability score from a new face image on behalf of the unique individual according to the learned perception of the unique individual; and
   wherein the DL neural network includes a convolution neural network (CNN), wherein the set of features includes a set of pre-defined facial features, and wherein training the CNN using the set of face images includes training a set of weights associated with the set of pre-defined facial features.

2. The computer-implemented method of claim 1, wherein prior to receiving the set of face images and the corresponding set of desirability scores, the method further comprises generating the corresponding set of desirability scores by:
   providing the set of face images to the unique individual; and
   guiding the unique individual to label each of the set of face images with a desirability score based on the unique individual's inherent ability of judging a face as desirable or undesirable.

3. The computer-implemented method of claim 1, wherein the desirability score for a given face image in the set of face images is one of a set of discrete values representing different degrees of desirability toward the given face image.

4. The computer-implemented method of claim 1, wherein for a particular group of individuals, the set of face images is substantially identical for each individual in the group of individuals, while the set of desirability scores is different for different individuals in the group of individuals.

5. The computer-implemented method of claim 1, wherein the set of features additionally includes a set of unspecified filters, wherein each of the set of unspecified filters includes a set of trainable parameters, and wherein training the CNN using the set of face images additionally includes training the set of trainable parameters in the set unspecified filters to construct the set unspecified filters for the unique individual.

6. The computer-implemented method of claim 1, wherein after generating the personalized face perception model, the method further comprises applying the personalized face perception model to a large number of new face images to select desirable face images among the new face images on behalf of the unique individual with very high accuracy, thereby preventing the unique individual from personally screening the large number of new face images.

7. The computer-implemented method of claim 6, wherein applying the personalized face perception model to the large number of new face images includes:
   receiving each new face image as an input to the personalized face perception model;
   generating a like/dislike decision or a desirability score for the new face image on behalf of the unique individual using the trained DL neural network; and
   if the new face image is determined with a like decision or to be desirable, providing the new face image to the unique individual as a personalized recommendation.

8. The computer-implemented method of claim 7, wherein the method further comprises:
   receiving a user decision on the recommended new face image from the unique individual; and
   updating the personalized face perception model using the new face image and the associated user decision as a part of new training data.

9. The computer-implemented method of claim 7, wherein the method further comprises:
   generating a plurality of personalized face perception models for a plurality of individuals, wherein each of the plurality of personalized face perception models corresponds to each of the plurality of individuals, and wherein each of the plurality of personalized face perception models generates a desirability score for an input face image on behalf of the corresponding individual, and wherein the desirability score has a value from a set of discrete values representing different degrees of desirability;

applying the plurality of personalized face perception models to a given face image to generate a set of desirability scores for the plurality of individuals; and computing an overall desirability score for the given face image by averaging the set of desirability scores, wherein the overall desirability score measures an overall degree of desirability for the given face image of the plurality of individuals.

10. A personalized face perception system, comprising:
one or more processors;
a memory coupled to the one or more processors;
a face perception model training subsystem including a deep learning (DL) neural network, wherein the DL neural network includes a set of features and a set of parameters associated with the set of features, wherein the face perception model training subsystem is configured to:
  receive a set of face images and a corresponding set of desirability scores, wherein each of the desirability scores represents a degree of desirability toward an associated face image provided by an individual based on the individual's perception of a desirable face; and
  train the DL neural network using the set of face images as inputs to the DL neural network and the corresponding set of desirability scores as outputs of the DL neural network to generate a personalized face perception model for the individual, wherein the personalized face perception model includes a trained set of parameters which is unique to the individual; and
a face image processing subsystem coupled to the face perception model training subsystem, wherein the face image processing subsystem is configured to:
  receive the personalized face perception model from the face perception model training subsystem;
  receive a set of new face images from an external source; and
  applying the personalized face perception model to the set of new face images to select desirable face images among the set of new face images on behalf of the individual with very high accuracy, thereby preventing the individual from personally screening the set of new face images.

11. The personalized face perception system of claim 10, wherein prior to receiving the set of face images and the corresponding set of desirability scores, the face perception model training subsystem is further configured to generate the corresponding set of desirability scores by:
  providing the set of face images to the unique individual; and
  guiding the unique individual to label each of the set of face images with a desirability score based on the unique individual's inherent ability of judging a face as desirable or undesirable.

12. The personalized face perception system of claim 10, wherein the desirability score for a given face image in the set of face images is one of a set of discrete values representing different degrees of desirability toward the given face image.

13. The personalized face perception system of claim 10, wherein the DL neural network includes a convolution neural network (CNN), and wherein the set of features includes a set of pre-defined filters representing a set of pre-defined facial features, and wherein training the CNN using the set of face images includes training a set of weights associated with the set of pre-defined facial features.

14. The personalized face perception system of claim 13, wherein the set of features additionally includes a set of unspecified filters, wherein each of the set of unspecified filters includes a set of trainable parameters, and wherein training the CNN using the set of face images additionally includes training the set of trainable parameters in the set unspecified filters to construct the set unspecified filters for the unique individual.

15. The personalized face perception system of claim 10, wherein the face image processing subsystem is configured to apply the personalized face perception model to a large number of new face images to select desirable face images among the new face images on behalf of the unique individual with very high accuracy, thereby preventing the unique individual from personally screening the large number of new face images.

16. The personalized face perception system of claim 15, wherein the face image processing subsystem is configured to apply the personalized face perception model to the large number of new face images by:
  receiving each new face image as an input;
  generating a like/dislike decision or a desirability score for the new face image on behalf of the unique individual using the trained DL neural network; and
  if the new face image is determined with a like decision or to be desirable, providing the new face image to the unique individual as a personalized recommendation.

17. The personalized face perception system of claim 16, wherein the face perception model training subsystem is further configured to:
  receive a user decision on the recommended new face image from the unique individual; and
  update the personalized face perception model using the new face image and the associated user decision as a part of new training data.

18. The personalized face perception system of claim 16, wherein the face perception model training subsystem is further configured to:
  generate a plurality of personalized face perception models for a plurality of individuals, wherein each of the plurality of personalized face perception models corresponds to each of the plurality of individuals, and wherein each of the plurality of personalized face perception models generates a desirability score for an input face image on behalf of the corresponding individual, and wherein the desirability score has a value from a set of discrete values representing different degrees of desirability; and
  wherein the face image processing subsystem is further configured to:
    apply the plurality of personalized face perception models to a given face image to generate a set of desirability scores for the plurality of individuals; and
    compute an overall desirability score for the given face image by averaging the set of desirability scores, wherein the overall desirability score measures an overall degree of desirability for the given face image of the plurality of individuals.

19. A computer-implemented method of constructing and using a personalized face perception model for a unique individual, the method comprising:
  receiving a set of face images and a corresponding set of desirability scores, wherein each of the desirability scores represents a degree of desirability toward an associated face image provided by an individual based on the individual's perception of a desirable face;

receiving a personalized face perception model based on a deep learning (DL) neural network, wherein the DL neural network includes a set of features and a set of parameters associated with the set of features;

training the personalized face perception model using the set of face images as inputs to the DL neural network and the corresponding set of desirability scores as outputs of the DL neural network to generate a trained personalized face perception model for the individual, wherein the trained personalized face perception model includes a trained set of parameters which is unique to the individual; and applying the trained personalized face perception model to a set of new face images to select desirable face images among the set of new face images on behalf of the individual with very high accuracy, thereby preventing the individual from personally screening the set of new face images.

* * * * *